United States Patent [19]

Barron et al.

[11] Patent Number: 5,659,355
[45] Date of Patent: Aug. 19, 1997

[54] CCD DARK MEAN LEVEL CORRECTION CIRCUIT EMPLOYING DIGITAL PROCESSING AND ANALOG SUBTRACTION REQUIRING NO ADVANCE KNOWLEDGE OF DARK MEAN LEVEL

[75] Inventors: Steven A Barron, San Diego; Hokon Olav Flogstad, La Mesa; Kurt Van Blessinger, Vista, all of Calif.

[73] Assignee: Eastman Kodak Company, Rochester, N.Y.

[21] Appl. No.: 332,215

[22] Filed: Oct. 31, 1994

[51] Int. Cl.$^6$ ............................................. H04N 9/64
[52] U.S. Cl. .................... 348/245; 348/255; 348/534; 348/697; 358/483
[58] Field of Search ........................... 348/243, 691, 348/695, 696, 697, 241, 255, 533, 534; 358/461, 463, 482, 483; H04N 9/64

[56] References Cited

U.S. PATENT DOCUMENTS

| | | | |
|---|---|---|---|
| 4,786,969 | 11/1988 | Shouji et al. | 358/171 |
| 4,907,084 | 3/1990 | Nagafusa | 358/171 |
| 4,974,072 | 11/1990 | Hasegawa | 358/80 |
| 5,038,225 | 8/1991 | Maeshima | 358/461 |
| 5,057,920 | 10/1991 | Wilkinson | 358/171 |
| 5,105,276 | 4/1992 | Schrock | 358/213.16 |
| 5,142,354 | 8/1992 | Suzuki et al. | 358/34 |
| 5,189,528 | 2/1993 | Takashima et al. | 358/448 |
| 5,278,658 | 1/1994 | Takase | 358/213.15 |
| 5,341,218 | 8/1994 | Kaneko et al. | 348/695 |
| 5,448,306 | 9/1995 | Koyama | 348/678 |

*Primary Examiner*—Thai Tran
*Assistant Examiner*—Ngoc-Yen Vu
*Attorney, Agent, or Firm*—William F. Noval

[57] ABSTRACT

A digital black clamp circuit for calibrating the black level of an image signal produced by an imaging device, such as a CCD sensor. The digital black clamp circuit comprises a source of a video signal having a first interval of black level pixels and a second interval of image pixels; a differential amplifier having first and second inputs and an output, wherein the source is coupled to one of the first and second inputs; an A/D converter coupled to the output of the differential amplifier; a digital signal processor coupled to the A/D for accumulating and averaging digital black level pixels; a D/A converter coupled to the digital signal processor; and a control for selectively uncoupling the D/A converter to the other of the first and second inputs of the differential amplifier during the first interval of the video signal; and for coupling the D/A converter to the other of the first and second inputs during the second interval of the video signal to clamp the image pixels to an average black level.

2 Claims, 3 Drawing Sheets

$$
\begin{array}{cccccccccc}
b_{11} & b_{12} & b_{13} & \cdots & b_{1\ell} & a_{11} & a_{12} & a_{13} & a_{14} & \cdots & a_{1m} \\
b_{21} & b_{22} & b_{23} & \cdots & b_{2\ell} & a_{21} & a_{22} & a_{23} & a_{24} & \cdots & a_{2m} \\
& & & & & & & & & & \\
b_{161} & b_{162} & b_{163} & \cdots & b_{16\ell} & a_{161} & a_{162} & a_{163} & a_{164} & \cdots & a_{16m} \\
& & & & & & & & & & \\
b_{m1} & b_{m2} & b_{m3} & \cdots & b_{m\ell} & a_{m1} & a_{m2} & a_{m3} & a_{m4} & \cdots & a_{mn}
\end{array}
$$

FIG. 1

CCD DARK MEAN LEVEL CORRECTION CIRCUIT EMPLOYING DIGITAL PROCESSING AND ANALOG SUBTRACTION REQUIRING NO ADVANCE KNOWLEDGE OF DARK MEAN LEVEL

FIELD OF INVENTION

This invention relates, in general, to image signal processing and relates more particularly to the calibration of the black level of an image signal produced by an imaging device (such as a CCD sensor) by means of a digital black clamp circuit.

DESCRIPTION OF THE PRIOR ART

Typically, the imaging signal produced by an imaging device, such as a CCD sensor, must be corrected for black level before the image signal is transmitted to a utilization device, such as a video monitor. It is known to correct for black level in an analog signal by clamping to the black signal level of the horizontal or vertical blanking period of the video signal (see U.S. Pat. No. 5,142,354, issued Aug. 25, 1992, inventors Suzuki et al.); or through the use of a sample and hold circuit (see U.S. Pat. No. 4,907,084, issued Mar. 7, 1990, inventor Nagafusa). Another technique for determining a black level correction signal is to read out image pixels of a imaging sensor when no light is falling on the sensor. The dark signal output for each image pixel is then digitized and stored in a black level correction memory. When the image sensor is exposed to an image, the image signal produced by each image pixel is corrected by the stored black level signal generated during the preliminary calibration period (see, for example, U.S. Pat. No. 5,189,528, issued Feb. 23, 1993, inventors Takashima et al.; U.S. Pat. No. 4,974,072, issued Nov. 27, 1990, inventor Hasegawa; and U.S. Pat. No. 5,038,225, issued Aug. 6, 1991; inventor Maeshima).

U.S. Pat. No. 5,341,218, issued Aug. 23, 1994, inventors Kaneko et al. discloses an interesting digital black level clamping circuit. As disclosed therein, a video signal clamping circuit (capable of maintaining a DC level of a digital video signal at a fixed level) samples the pedestal level of a vertical blanking period of a digital video signal. An average value of a plurality of sampling data in a plurality of fields is calculated by an average value calculator. The average value is compared with a predetermined clamp level reference value by a comparison output circuit. The disclosed circuit is disadvantageous because it (1) clamps to a vertical sync black level, (2) requires the use of a sample and hold circuit, (3) cannot adapt to different analog gains, and (4) uses a complex and expensive ROM difference calculator with associated comparators.

Another known technique for calibrating black level is used with CCD sensors which have a few masked off black pixels at the end or beginning of each line. These pixels are masked off to prevent light sensitivity, but behave like the rest of the pixels with respect to the dark current charge accumulation. The black pixels also have a similar noise characteristic as the light sensitive ones. The values of the black pixels form a normal, or Gaussian, distribution with a mean value that is very constant and representative of the entire frame. The information from the black pixels is used to set the black level for the whole frame. In the standard analog method of setting the black level, a clamping circuit with low pass filtering and averaging is used to estimate the true black level. The longer the averaging time, the more accurate is the black value obtained, but the response is slower. A problem exists, however, in providing a method of setting the black level in a digital video system which is accurate, simple, inexpensive and readily implemented in known CCD sensor circuits.

SUMMARY OF THE INVENTION

According to the present invention, there is provided a solution to the problems of the prior art black level calibration techniques. The invention is applicable to a digital video system. It can quickly obtain a very accurate black level value that can be fed back into a loop to correct image signals. The invention is simple, inexpensive, reliable, and adaptable.

According to a feature of the present invention, there is provided a digital black clamp circuit comprising a source of a video signal having a first interval of black level pixels and a second interval of image pixels; a differential amplifier having first and second inputs and an output; wherein said source is coupled to one of said first and second inputs; an analog-to-digital converter (ADC) coupled to said output of said differential amplifier; a digital signal processor coupled to said ADC for accumulating and averaging digital black level pixels in said first interval to produce and average black level signal; a digital-to-analog converter (DAC) coupled to said digital signal processor for converting a digital signal to an analog signal; and a control for selectively uncoupling said DAC to the other of said first and second inputs of said differential amplifier during said first interval of said video signal; and for coupling said DAC to said other of said first and second inputs during said second interval of said video signal to clamp said image pixels to said average black level.

DESCRIPTION OF THE DRAWINGS

FIG. 1 is a diagrammatic view of an image sensor having masked off black pixels as well as imaging pixels.

DESCRIPTION OF THE PREFERRED EMBODIMENTS

Referring now to FIG. 1, there is shown a diagrammatic illustration of the arrangement of pixels in a CCD sensor having masked off black pixels at the beginning of each line of the sensor. The masked pixels are represented by "b" and image pixels are represented by "a". Thus, the first line has black pixels $b_{11}$, $b_{12}$, $b_{13}$, --, $b_{1l}$, and image pixels $a_{11}$, $a_{12}$, $a_{13}$, $a_{14}$, --, $a_{1n}$. The last line is represented by black pixels $b_{ml}$ to $b_{ml}$ and image pixels are represented by $a_{m1}$ to $a_{mn}$. l represents the number of black pixels in a line, for example, 10; n represents the number of image pixels in a line; and m represents the number of lines in the sensor array.

When the image sensor diagrammatically illustrated in FIG. 1 is read out pixel by pixel and line by line, the black pixels "b" are read out first in each line followed by the image pixels "a". It will be understood that the black pixels "b" may also be located at the end of a line and be read out after the image pixels "a" are read out. As noted above, the black pixels "b" are masked off to prevent light sensitivity, but behave like the rest of the image pixels "a" with respect to the dark current charge accumulation. The black pixels b also have a similar noise characteristic as the light sensitive image pixels a. The values of the black pixels form a normal or Gaussian distribution with a mean value that is very constant and representative of the entire image frame. The information from the black pixels b is used to set the black level for the whole image frame.

Figure 2:
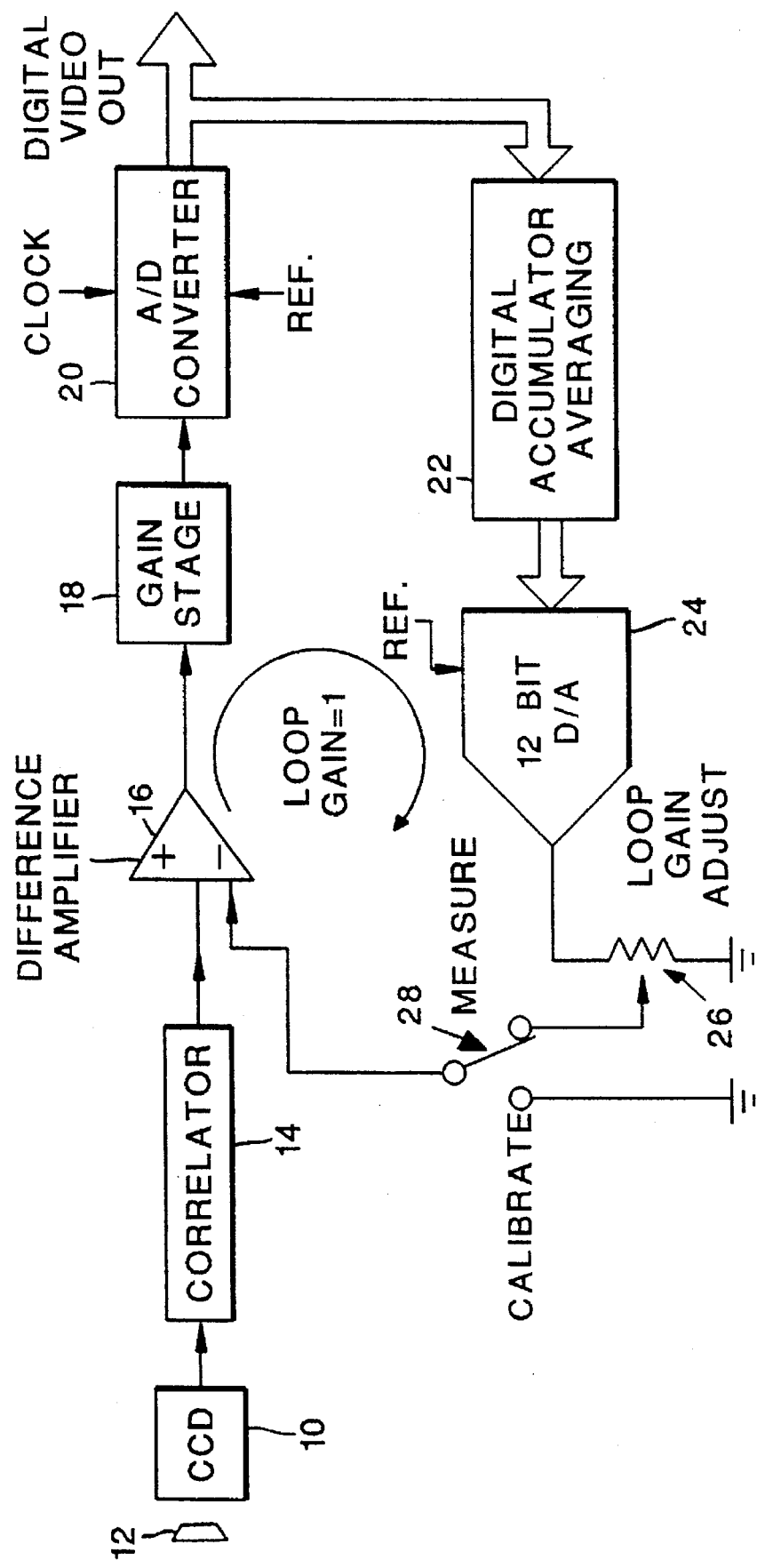
FIG. 2 is a block diagram of a black level clamp circuit according to the present invention.

Referring now to FIG. 2, there is shown an embodiment of the present invention. As shown, a CCD image sensor 10, having masked black pixels as depicted in FIG. 1, images a scene through lens 12 and produces a video signal which is processed by correlator circuit 14 to produce a correlated image signal. The image signal channel includes the difference amplifier 16, gain stage 18, and analog-to-digital converter 20, which converts the analog video signal to a digital video signal. According to a feature of the present invention, the black level pixel signals which are digitized by ADC 20 are accumulated and averaged in digital accumulator and averaging circuit 22. Thus, a very accurate black level value can be obtained quickly and fed back into a loop to correct the image signal. This is accomplished by using digital-to-analog converter 24 to convert the average black level digital value into a corresponding analog voltage. The analog black level voltage is applied through loop gain adjust potentiometer to the "−" input of differential amplifier 16 for the loop to work. The loop gain adjust potentiometer must be adjusted so that loop gain is set exactly to unity. A switch 28 is provided to couple the inverting input of amplifier 16 between ground and the output of DAC 24 by way of potentiometer 26.

During the acquisition of the black pixels by digital accumulator averaging circuit 22, the output of DAC 24 is switched to ground through potentiometer 26, so that no correction is subtracted from the image signal. Thus, circuit 22 measures and averages the black pixel absolute values from the video signal. When all of the black level pixels have been added at the end of the calibration cycle (FIG. 3, $t_2$), DAC 24 is updated with the average digital value of the black pixels. Switch 28 is moved from the calibrate position to the measure position, and the video out of converter 20 is always measured with respect to the black pixels average value which has been subtracted from the image signal in difference amplifier 16. The black pixels are never sampled with the correction value from DAC 24 in the circuit. This is a unique feature over prior art black level clamping techniques. The circuit of FIG. 2 does not feed back the correction and measure an error as in a servo system. The only feedback of the correction is for valid video (not the black pixels).

Figure 3:
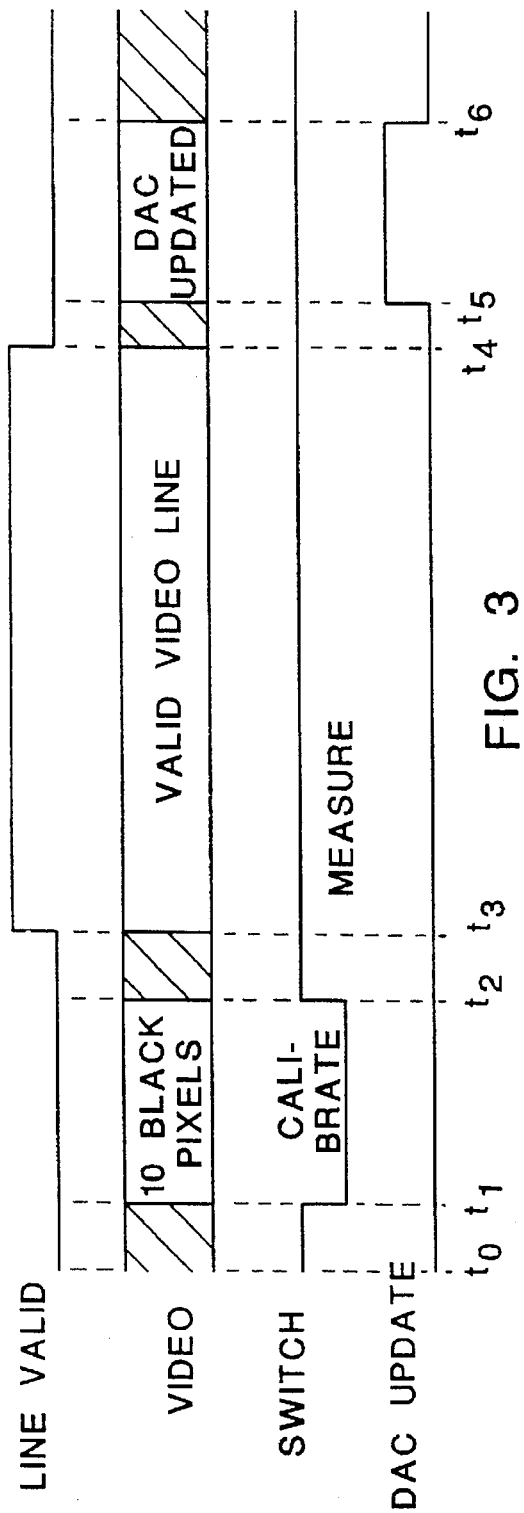
FIGS. 3 and 4 are respective line timing and frame timing diagrams useful in explaining the operation of the present invention.

FIG. 3 is a set of timing diagrams which are useful in describing the operation of the circuit of FIG. 2. The second timing diagram is of the video signal and shows the black pixel information during the time $t_1$ to time $t_2$. The image pixels, or valid video line, continues from $t_3$ to $t_4$.

Although the black pixels are accumulated before the valid video starts, due to pipeline delay in the analog-to-digital converter 20 and the settling time of the digital-to-analog converter 24, the average value is not loaded into DAC 24 until after the last valid image pixel of the line is shifted out of the camera 10. Thus, between time $t_5$ and $t_6$, DAC 24 is updated from circuit 22.

Figure 4:
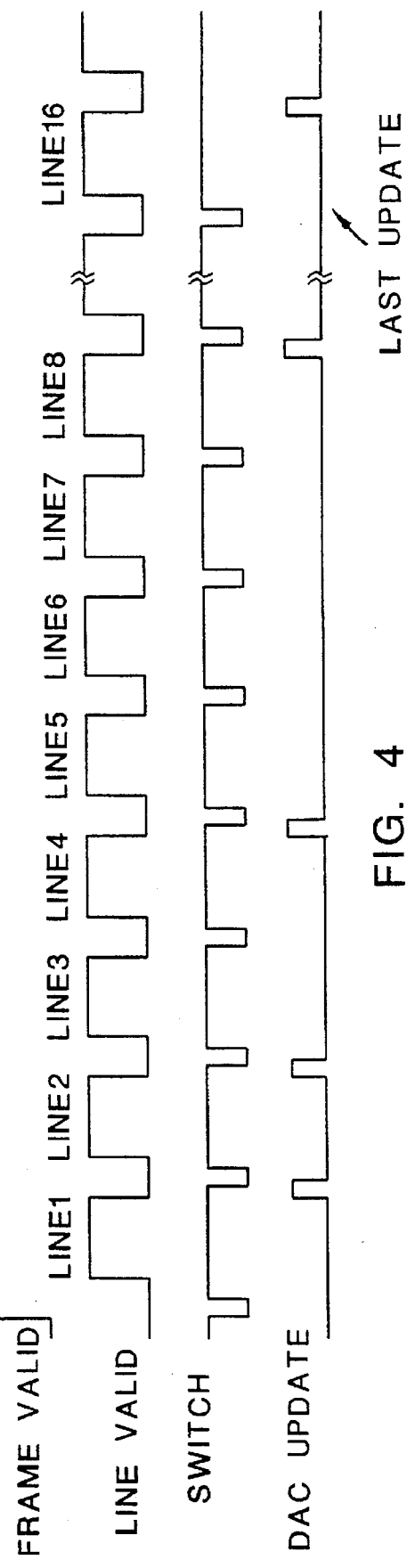

In a more elaborate version of the accumulation and averaging of black level pixels discussed above, a successive approximation averaging can be done such that preliminary values are obtained that become more accurate as more lines of video are accumulated. In an implementation of the sensor depicted in FIG. 1, there are 10 black pixels at the beginning of each line. It has been found that more than 100 black level pixel samples are needed to obtain a black clamp value that remains constant enough from frame to frame. Thus, more than 10 lines of the image sensor 10 are needed to achieve the best estimate of the black level. In the implementation, 16 lines are chosen. FIG. 4 is a set of timing diagrams illustrating this implementation.

During these 16 lines, the video needs to have some black level subtracted from it so that it does not look significantly different from the rest of the lines. To accomplish this, an average is taken after the first line and then again after the second, fourth, eighth, and sixteenth lines. Each new average is a little better than the previous because there are more samples taken. After 16 lines, there are 160 black pixel samples. At the end of the 16th line, the DAC 24 is updated for the last time and held until the start of the next frame. It does not servo throughout the frame of the video.

Because the camera of FIG. 2 is a multi-gain camera, the gain is always set to a constant value during the sampling of black pixels, but during the valid video, the gain switches back to the program value.

The invention has been described in detail herein with reference to the figures, however it will be appreciated that variations and modifications are possible within the spirit and scope of the invention.

What is claimed is:

1. A digital black clamp circuit comprising:

a source of successive lines of a video signal, each line having a first interval of black level pixels and a second interval of image pixels;

a differential amplifier having first and second inputs and an output; wherein said source is coupled to one of said first and second inputs;

an analog-to-digital converter (ADC) coupled to said output of said differential amplifier;

a digital signal processor coupled to said ADC for accumulating and averaging digital black level pixels in said first interval to produce and average black level signal;

a digital-to-analog converter (DAC) coupled to said digital signal processor for converting a digital signal to an analog signal; and a control for controlling said digital signal processor and said digital-to-analog converter to cause said digital signal processor to accumulate and average digital black level pixels in the first interval of line of the video signal and to load an average black value into said DAC during the first interval of a next line of video signal in order to eliminate signal errors due to pipeline delay and settling time of said DAC.

2. The circuit of claim 1 wherein said control updates said DAC after first, second, fourth, eighth, and sixteenth lines of each frame of said video signal.

* * * * *